(12) United States Patent
Den Hollander et al.

(10) Patent No.: US 7,783,200 B2
(45) Date of Patent: Aug. 24, 2010

(54) METHOD AND APPARATUS FOR CONSTANT BIT RATE DATA TRANSMISSION IN AN OPTICAL BURST SWITCHING NETWORK

(75) Inventors: Cornelis Johannis Den Hollander, Huizen (NL); Geoffrey M. Garner, Red Bank, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1105 days.

(21) Appl. No.: 11/333,343

(22) Filed: Jan. 18, 2006

(65) Prior Publication Data

US 2006/0159130 A1    Jul. 20, 2006

(30) Foreign Application Priority Data

Jan. 18, 2005  (KR) .................. 10-2005-0004691
Sep. 6, 2005   (KR) .................. 10-2005-0082802

(51) Int. Cl.
*H04B 10/00* (2006.01)

(52) U.S. Cl. .................. 398/155; 398/154; 398/58; 370/503; 370/375; 375/372; 375/376

(58) Field of Classification Search ............... 398/154, 398/155, 161, 45, 53, 58, 89, 52, 46, 47, 398/54; 370/253, 389, 232, 363, 368, 374, 370/381, 230, 229, 429, 503, 375; 375/372, 375/376

See application file for complete search history.

(56) References Cited

U.S. PATENT DOCUMENTS

| | | | |
|---|---|---|---|
| 6,810,215 B1 * | 10/2004 | Oikawa | 398/175 |
| 6,952,533 B2 * | 10/2005 | Kim et al. | 398/166 |
| 7,164,860 B1 * | 1/2007 | Narvaez et al. | 398/58 |
| 7,286,487 B2 * | 10/2007 | Perkins et al. | 370/253 |
| 7,421,203 B2 * | 9/2008 | Kim et al. | 398/59 |
| 2002/0075980 A1 * | 6/2002 | Tang et al. | 375/372 |

* cited by examiner

*Primary Examiner*—Hanh Phan
(74) *Attorney, Agent, or Firm*—Sughrue Mion, PLLC

(57) ABSTRACT

A method, core node, ingress edge node, and egress edge node for matching a bit rate of data input into an optical burst switching network with that of data output from the optical burst switching network are provided. The method includes calculating a difference between a frequency of optical data received on a node and a natural frequency of the node; including the calculated difference into control information; and transmitting the control information. The core node includes a calculator to calculate a difference between frequency of optical data and the natural frequency of the optical data; and a controller to add the difference and a difference included in control information, and output the added difference. The ingress edge node includes a data processor; and a controller. The egress edge node includes an ingress edge node clock recovery phase lock loop; a de-mapper; and a storage unit.

12 Claims, 7 Drawing Sheets

METHOD AND APPARATUS FOR CONSTANT BIT RATE DATA TRANSMISSION IN AN OPTICAL BURST SWITCHING NETWORK

This application claims benefits under 35 U.S.C. §119 from Korean Patent Application No. 2005-4691 filed on Jan. 18, 2005 and Korean Patent Application No. 2005-82802 filed on Sep. 6, 2005 in the Korean Intellectual Property Office. The entire contents of both applications are incorporated herein by reference.

BACKGROUND OF THE INVENTION

1. Field of the Invention

The present invention relates to an optical burst switching (OBS) network and, more specifically, to a method for matching a transmission rate of burst data input into an optical burst switching network and a transmission rate of burst data output.

2. Description of the Related Art

Generally, when an optical signal is transmitted and received through an optical link, an electrical switch is used. However, the electrical switch must first convert the optical signal into an electrical signal, in order to process the optical signal transferred. Then, it must convert the processed electrical signal back to an optical signal prior to transmission. So, the electrical switch additionally needs an optoelectric converter to convert the optical signal into the electrical signal and electrooptic converter to convert the electrical signal into the optical signal, resulting in an increased cost.

In order to solve such a problem, there was proposed an optical burst switch, which does not convert the transferred optical signal into the electrical signal but processes the optical signal directly. Hereinafter, an optical burst switching network using an optical burst switch will be described.

In the optical burst switching network, generally, internet protocol (IP) packets input in an optical domain are gathered as burst data in an edge node, and such burst data is routed by way of a core node depending on destinations of the packets or Quality of Services (QoS) and then sent to the destination nodes. Further, a burst control packet (BCP) and the burst (optical) data are respectively transmitted on different channels and at an offset time. That is, the burst control packet is transmitted earlier than the burst data by the offset time and the burst control packet previously reserves a path through which the burst data is transferred, so that the burst data can be transmitted through the optical network at a high speed without being buffered. Hereinafter, a procedure for transmitting the optical data will be described with reference to FIG. 1.

FIG. 1 is a view showing nodes for transmitting and receiving, or switching, burst data in an optical burst switching network. Hereinafter, a procedure to transmit the burst data in the optical burst switching network will be described.

When a node A 100 which is an edge node receives IP packets, it gathers the IP packets and forms the burst data. Edge nodes 100, 106 and 108 gather the IP packets, and form and transmit the optical burst packet. Further, the edge nodes 100, 106 and 108 receive the optical burst data and divide it into the IP packets. The core nodes 102 and 104 optically switch the burst data. When a desired size of burst data is generated, the node A 100 generates a burst control packet (BCP) and transmits it to the node B 102, a core node. The node A 100 transmits the burst data to the node B 102 after an offset time. The BCP includes information on a destination address of the burst data, a source address of the burst data, a size of the burst data, QoS, and an offset time, and other such information known in the art.

The node B 102 uses the BCP to identify the destination address of the burst data which will be received, determine an optical path and schedule time for the optical switching. In the node B 102, while the burst control packet is converted from the optical signal to the electrical signal or vice versa, the burst data goes through the optical path by the optical switching without optoelectric conversion. The node B 102 can switch the burst data to the node D 106 or the node C 104 depending on whether the destination of the burst data transmitted from the node A 101 is the node D 106 or the node E 108.

The procedure where the node B 102 transfers the burst data transmitted from the node A 100 to the node D 106 or the node E 108 was explained in the above description. However, the node B 102 may either be a destination of the burst data generated in the node A 100, or may generate burst data to be transmitted to the node D 106 or the node E 108. In other words, the node B 102 may be a core node or may have a function of an edge node.

In case of the node B, however, there occurs a case where both the node A and the node C attempt to send burst data simultaneously to the node D. In this case, since the node B cannot transfer both transferred burst data from nodes A and C to the node D at the same time, the node B selects the burst data from one of the nodes A and C and transmits that burst data first. Thereafter, the burst data from the node that was not selected is transmitted after a certain time, so that the burst data can be prevented from being lost.

Data input to the optical burst switching network can be generally divided into two types: data of constant bit rate (CBR), such as voice data, and data of variable bit rate (VBR), such as packet data. The data of constant bit rate should be received in the receiving-end with the same bit rate as that of data transmitted in the transmitting-end.

FIG. 2 is a view showing a bit rate of data received in an optical burst switching network. Referring to FIG. 2, an optical burst switching network includes an ingress edge node (node A), an egress edge node (node D) and core nodes (node B, node C) that are also edge nodes. The nodes constructing the optical burst switching network have their own natural frequencies (the number of clocks per unit time). As shown in FIG. 2, natural frequencies of node A, node B, node C and node D are $f_a$, $f_b$, $f_c$ and $f_d$, respectively. Since phase may be represented by integrating the frequency, phase, frequency and the number of clocks per unit time are all regarded as having the same meaning, hereinafter.

Referring to FIG. 2, it is noted that phases of data output from the node A, data output from the node C, data input into a damper (not shown) constructing the node D, and data output from the node D are different from one another. As described above, data of a constant bit rate should be transmitted at a fixed rate. However, a bit rate of data input into the optical burst switching network is different from that of data output therefrom. Such a problem is due to the characteristic of the optical burst switching network as well as differences of the natural frequencies of nodes. That is, the optical burst switching network does not transmit circuit data but transmits data by burst consisted of a plurality of packets. Accordingly, the packet data that are received first should be on standby (delayed) until other data is received. Further, in case that the core node has no link available for transmission of the burst data, the burst data is placed on the standby in the core node for a certain time. As such, the data transmitted to the optical burst switching network is delayed for various reasons, and the constant bit rate cannot be guaranteed for such reasons.

SUMMARY OF THE INVENTION

The present invention has been developed in order to address the above drawbacks and other problems associated with the conventional arrangement. An aspect of the present invention is to provide a method for matching bit rates of data input to the optical burst switching network and of data output therefrom.

Another aspect of the present invention is to provide a method for transmitting user desired data efficiently by matching bit rates of data input to the optical burst switching network and of data output therefrom.

According to an exemplary embodiment of the present invention, a method is provided for transmitting control information of the optical data, in a core node to transfer optical data received from an ingress edge node or a core node to an egress edge node or a core node, the method comprising the steps of: calculating a difference between the number of clock of optical data transferred to an input link in a unit time and the number of clocks in a unit time of a natural frequency of the core node; and including the calculated difference into the control information and then transmitting the control information.

According to another exemplary embodiment of the invention, a core node is provided that comprises a calculator for calculating a difference between the number of clock of optical data transferred to an input link in a unit time and the number of clock in a unit time of a natural frequency of the optical data; and a controller for adding the difference transferred from the calculator and a difference included in a control information transferred to the input link and outputting the added difference.

According to another exemplary embodiment of the present invention, an ingress node is provided that comprises a data processor for reading and processing stored data of a constant bit rate according to a clock of the node; and a controller for calculating information on the number of clocks in a unit time of the data of a constant bit rate and the number of clocks in a unit time of the ingress edge node, and including the calculated information into control information.

According to yet another exemplary embodiment of the present invention, an ingress node is provided that comprises an optical burst switching network comprising: an ingress edge node clock recovery PLL for calculating the number of clocks of an ingress edge node in a unit time based on received control information; a de-mapper for calculating the number of clock of received optical data in a unit time when the optical data is received in the ingress edge node, using the number of the received clock in the ingress edge node in a unit time and the control information; and a storage unit for outputting the optical data stored according to the number of clock transferred from the de-mapper in a unit time.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Hereinafter, a method for matching bit rates of data input to the optical burst switching network and of data output therefrom in accordance with an exemplary embodiment of the present invention will be described with reference to the accompanying drawings.

Figure 1:
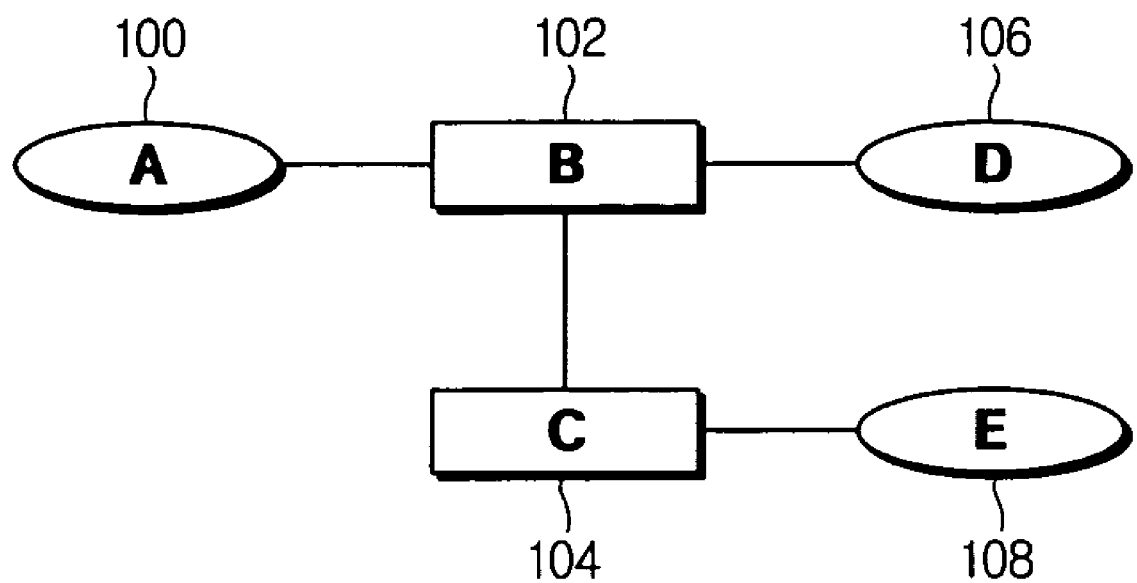
FIG. 1 is a view showing a configuration of an optical burst switching network in the art.
Figure 2:
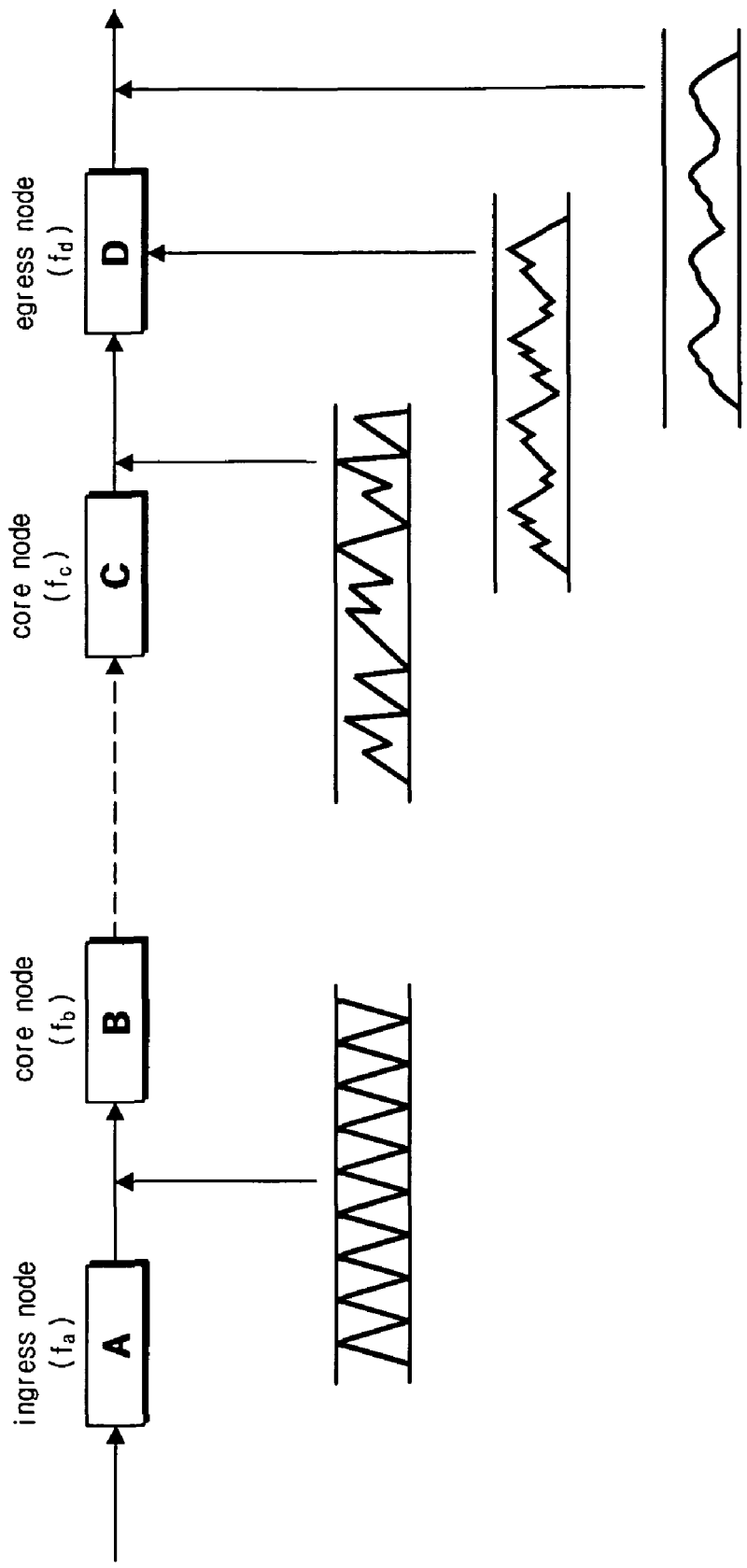
FIG. 2 is a view showing a bit rate of data received in an optical burst switching network in the art.
Figure 3:
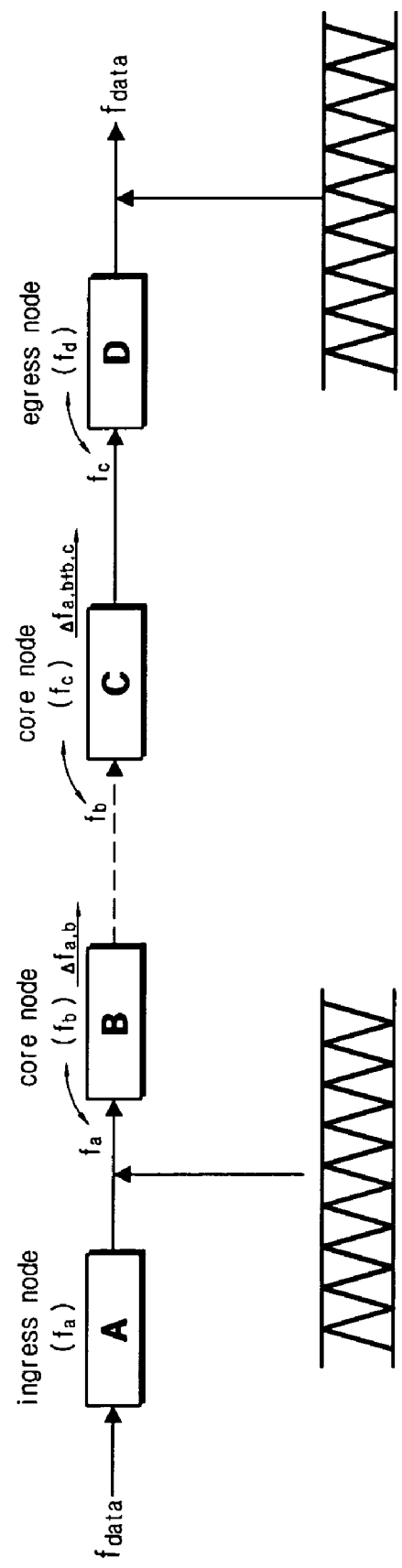
FIG. 3 is a view showing an optical burst switching network constructed of an ingress edge node, an ingress edge node, and a plurality of core nodes in accordance with an exemplary embodiment of the present invention

FIG. 3 shows an optical burst switching network constructed of an ingress edge node, an egress edge node, and a plurality of core nodes in accordance with an exemplary embodiment of the present invention. Hereinafter, operations performed in nodes constructing the optical burst switching network in accordance with an exemplary embodiment of the present invention will be described with reference to FIG. 3.

Referring to FIG. 3, each node processes data transferred in its natural frequency. That is, natural frequencies of node A, node B, node C and node D are $f_a$, $f_b$, $f_c$ and $f_d$, respectively. Each node calculates a frequency difference between a frequency of data received on an input link of the node and the natural frequency of the node. That is, each node calculates a clock difference between the number of clocks of data received on the input link per unit time and the number of its own clocks per unit time. Describing it in another way, each node calculates a value corresponding to a difference between the number of clocks during M cycle (generally, length of frame) and the number of clocks of data received on the input link. Further, each node calculates a value corresponding to a difference between the number of clocks during the M cycle of the input link and the number of its own clocks.

In an operation of the node B, the node B calculates a difference between a frequency of data received on the input link (fa) and the natural frequency of the node B ($f_b$). The node B includes this calculated frequency difference in the control signal and transfers it to the node C on a control channel. The node C calculates a difference between a frequency of data received on its input link ($f_b$) and its own natural frequency ($f_c$) The node C then includes the calculated frequency difference into the control signal and transfers it to the node D. The node D, i.e., the destination edge node or ingress node, identifies the natural frequency of the node A using the frequency difference included in the transferred control signal.

Figure 4:
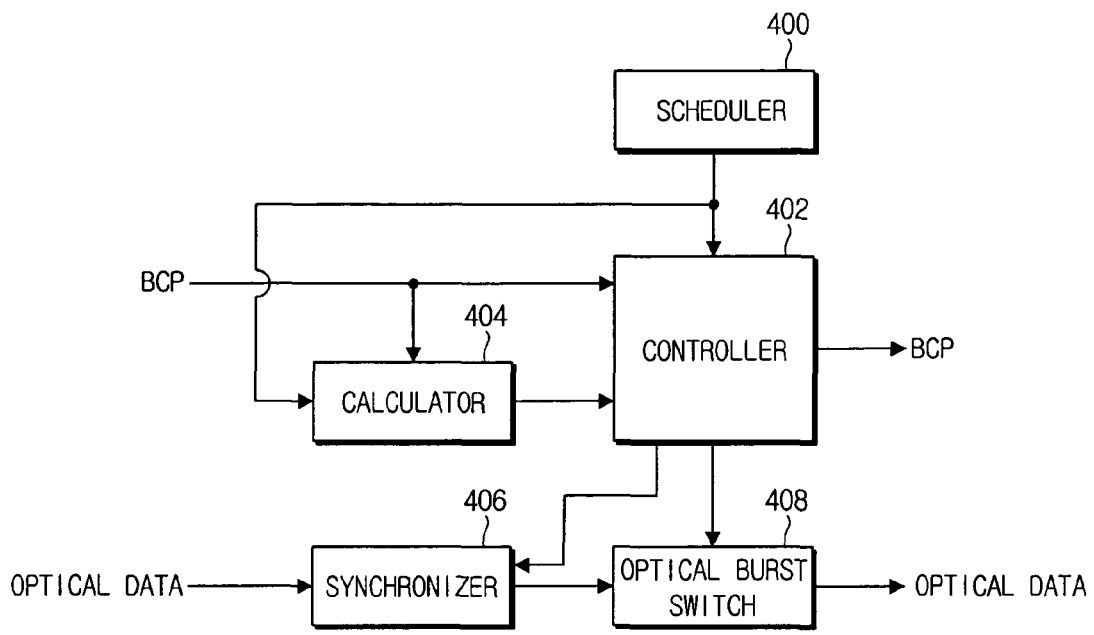
FIG. 4 is a view showing a configuration of a core node in accordance with an exemplary embodiment of the present invention.

FIG. 4 is a view showing a configuration of a core node in accordance with an exemplary embodiment of the present invention. Referring to FIG. 4, a core node includes a scheduler 400, a controller 402, a calculator 404, a synchronizer 406, and an optical burst switch 408. Of course, components other than the components shown in FIG. 4 may be included into the core node. FIG. 4 shows only certain components for description convenience. Further, the scheduler 400 and controller 402 can operate as one component.

The scheduler 400 transfers a natural frequency of the core node to the controller 402 and calculator 404. Further, the scheduler 400 performs scheduling for transmitting the data to be transmitted. The controller 402 determines a transmission time and a transmission link of the data transferred using control information transferred from the scheduler 400. Further, the controller 402 synchronizes the processing time of the input burst data with its own clock by controlling a synchronizer 406. An optical burst switch 408 switches the data transferred from the synchronizer 406 according to a control command of the controller 402.

The calculator 404 receives information on a frequency of the input link from the control signal BCP which has been received. Further, the calculator 404 receives the natural frequency of the core node from the scheduler 400, and calculates a difference between a frequency of the received input link and the natural frequency. The frequency difference calculated is transferred to the controller 402.

The controller 402 is updated by adding this calculated frequency difference to the frequency difference included in the control signal. The updated frequency difference is transferred to another core node or edge node whose address is included in the control signal. Of course, when data transferred from the synchronizer 406 or optical burst switch 408 is delayed, the calculator 404 transfers information on the delay to the controller 402, simultaneously.

If each core node repeatedly performs operations performed in the components shown in FIG. 4, the ingress edge node can collect information on a difference between a natural frequency of the ingress edge node and that of the last core node.

Figure 5:
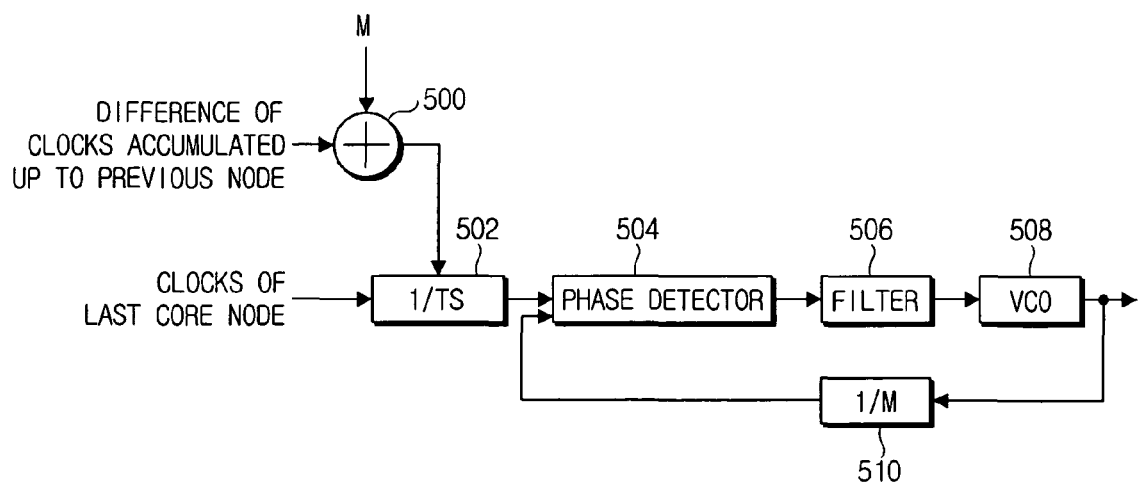
FIG. 5 is a view showing a configuration of an egress edge node to obtain clocks of ingress edge node in accordance with an exemplary embodiment of the present invention.

FIG. 5 is a view showing a configuration of a phase lock loop (PLL) to obtain the number of clocks per M cycle of an ingress edge node in accordance with an exemplary embodiment of the present invention. The PLL includes an adder 500, a 1/TS frequency divider 502, a phase detector 504, a filter 506, a voltage controlled oscillator (VCO) 508, and a 1/M frequency divider 510. Although it is evident that the PLL can include other than the components described above, FIG. 5 shows only certain components for descriptive convenience.

The adder 500 receives the difference of clocks accumulated from nodes up to and including the previous core node and the number of clocks during M cycle and adds them. As described above, M is a length of the frame. The value calculated in the adder 500 is transferred to the 1/TS frequency divider 502. The 1/TS frequency divider 502 divides the clock of the previous node received on the input link by the number of clocks from the adder 500. So, the 1/TS frequency divider 502 outputs a low frequency signal, instead of a high frequency signal, to the phase detector 504. The reason why the low frequency signal instead of the high frequency signal is transferred to the phase detector 504 is described below. The number of clocks per M cycle output from the 1/TS frequency divider 502 is the same as that of clocks used in the ingress edge node per M cycle.

The phase detector 504 calculates a difference between clocks (phase, frequency) transferred from the 1/TS frequency divider 502 and clocks of the signal transferred from the 1/M frequency divider 510 and outputs the calculated clock difference to the filter 506. The filter 506 filters various abnormal frequencies caused by the loop operation and changes voltage of VCO 508 through changing an accumulated charge using a capacitor. The VCO 508 transfers a signal having a frequency depending on the voltage transferred from the filter. The frequency of signal output from the VCO 508 becomes equal to that of the signal used in the ingress edge node. The 1/M frequency divider 510 divides the frequency of the signal transferred from the VCO by the value of M. That is, since the signal output from the VCO 508 is a high frequency signal, there occurs an error in an operation of the phase detector 504 when the signal is used as it was intended. Accordingly, in order to reduce the error, the high frequency signal transferred is converted into the low frequency signal.

Figure 6:
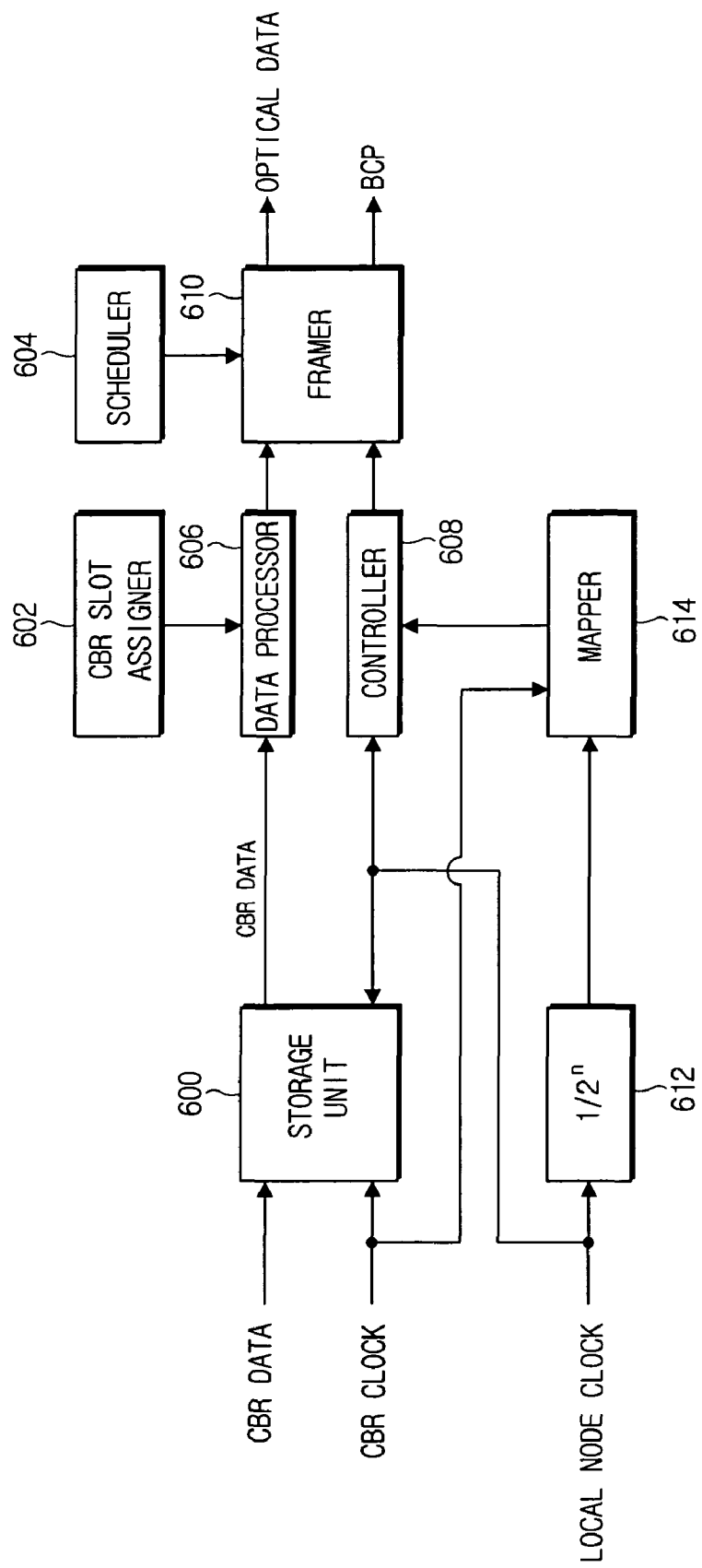
FIG. 6 is a view showing a configuration of an ingress edge node in accordance with an exemplary embodiment of the present invention.

FIG. 6 is a view showing a procedure to transmit data received to a core node in an ingress edge node in accordance with an exemplary embodiment of the present invention. Referring to FIG. 6, the ingress edge node includes a storage unit 600, a common bit rate (CBR) slot assigner 602, a scheduler 604, a data processor 606, a controller 608, a framer 610, a $\frac{1}{2}''$ frequency divider 612, and a mapper 614.

The storage unit 600 stores CBR data depending on CBR clock transferred. Further, the storage unit 600 outputs the CBR data stored depending on a local node clock (its own clock) transferred. The data processor 606 is assigned a slot to transmit the CBR data transmitted depending on information transferred from the CBR slot assigner 602. The data processor 606 transfers the CBR data transferred from the assigned transmission slot to the framer 610. The framer 610 processes and outputs the transferred CBR data in the unit of frame. The CBR slot assigner 602 assigns a slot to the transferred CBR data. The scheduler 604 outputs the clock of the node and transfers its own clock to each of the devices which make up the ingress edge node including the framer 610.

The $\frac{1}{2}''$ frequency divider 612 divides the clock frequency of the local node transferred into $\frac{1}{2}''$ so as to make a low clock frequency. FIG. 6 provides an example of the frequency division of the clocks of the local node using the $\frac{1}{2}''$ frequency divider 612. However, the frequency division need not always divide by this value. That is, it is evident that frequency division using another frequency divider rather than the $\frac{1}{2}''$ frequency divider 612 may be used. The reason why the transferred clock of the local node is divided in frequency is the same as that described above. The mapper 614 extracts information on clocks of the CBR data transferred and the local node. That is, it extracts information on a difference between the clock of the CBR data and the clock of the local node, and transfers the extracted information to the controller 608. By doing so, the egress edge node can identify the clock of the CBR data received from the ingress edge node.

Figure 7:
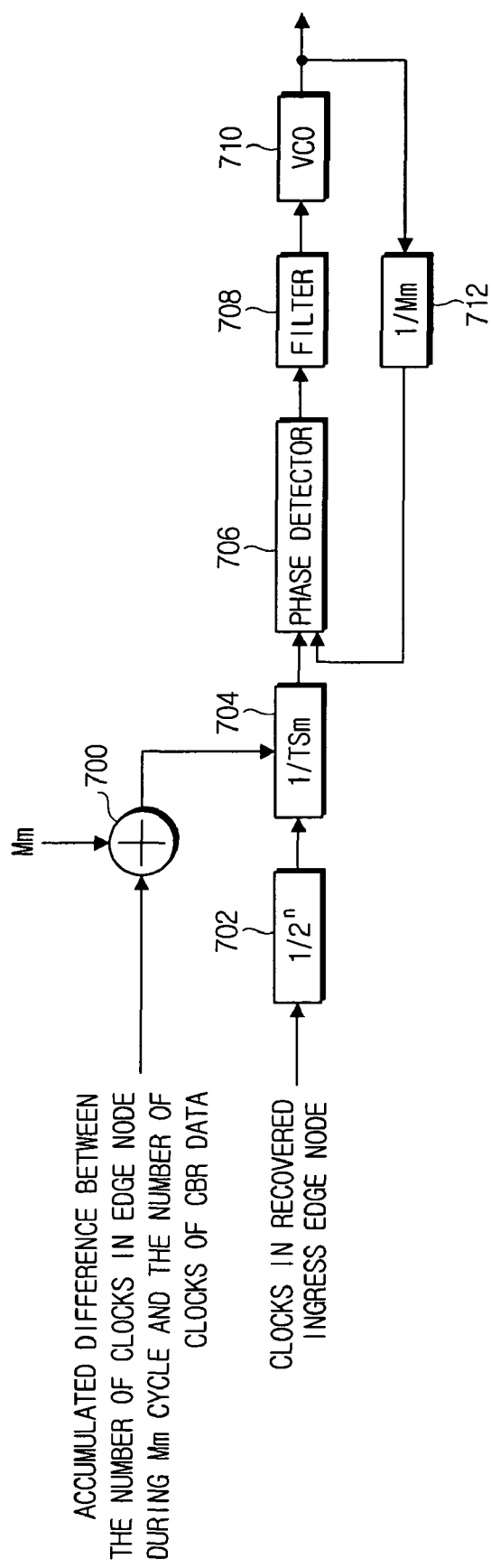
FIG. 7 is a view showing a configuration of an egress edge node to obtain clocks of common bit rate data input into an ingress edge node in accordance with an exemplary embodiment of the present invention.

FIG. 7 is a view showing a PLL (de-mapper) used to obtain the number of clocks (frequency) of the CBR data transferred to the ingress edge node in a unit time by the egress edge node in accordance with the present invention. Referring to FIG. 7, the PLL includes a $\frac{1}{2}''$ frequency divider 702, a 1/TSm frequency divider 704, an adder 700, a phase detector 706, a filter 708, a VCO 710, and a 1/Mm frequency divider 712. Operations performed in the phase detector 706, filter 708, VCO 710 and 1/Mm frequency divider 712 are the same as those of the phase detector 504, filter 506, VCO 508, and 1/M frequency divider 510 so that a description for that will be omitted.

The adder 700 adds an accumulated difference between the clocks of the ingress edge node and the clocks of the CBR data during the Mm cycle, and the Mm. At this time, Mm is the number of CBR data estimated by total mapping time stamp (TSm). The adder 700 transfers the added clocks to the 1/TSm frequency divider 704. The $\frac{1}{2}''$ frequency divider 702 receives the recovered clocks of the ingress edge node and divides the transferred clocks by ½" in frequency. The ½" frequency divider 702 transfers the clocks divided in frequency to the 1/TSm frequency divider 704. The 1/TSm frequency divider 704 divides the clocks transferred from ½" in frequency by the TSm transferred to the adder 700. A value output from the 1/TSm frequency divider 704 is the same as the clock of the CBR data input into the ingress edge node.

Figure 8:
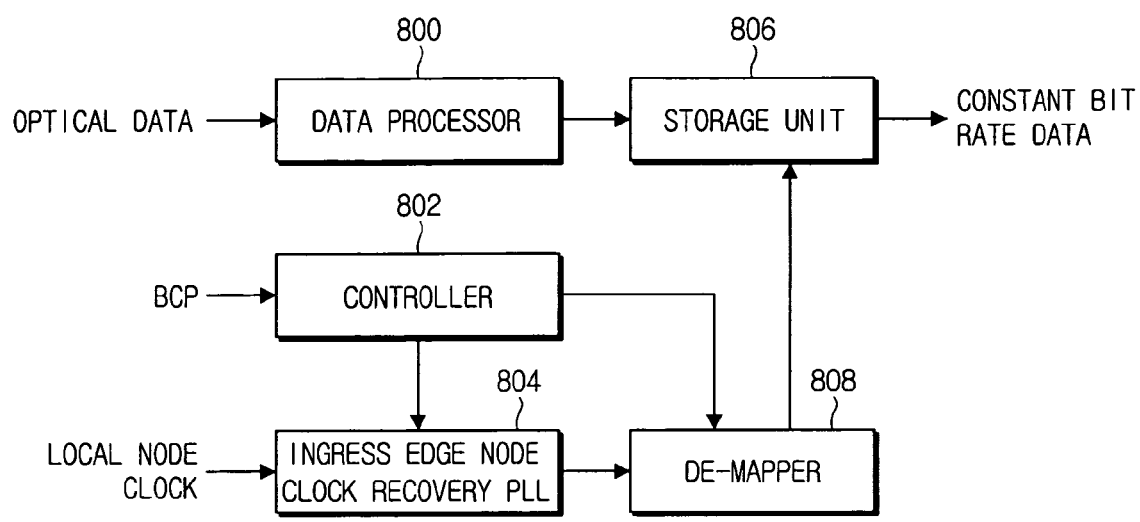
FIG. 8 is a view showing a configuration of an egress edge node in accordance with an exemplary embodiment of the present invention.

FIG. 8 is a view showing a configuration to transfer CBR data received by the egress edge node to an external part of an optical burst switching network in accordance with an exemplary embodiment of the present invention. Referring to FIG. 8, the egress edge node includes a data processor 800, a controller 802, an ingress edge node clock recovery PLL 804, a storage unit 806, and a de-mapper 808.

The data processor 800 receives optical burst data from the core node. The data processor 800 processes the optical burst data received into CBR data and then transfers it to the storage unit 806. The controller 802 receives control information on the optical burst data transferred from the core node on a control channel. The control information transferred is transferred to the ingress edge node clock recovery PLL 804. The ingress edge node clock recovery PLL 804 obtains a natural frequency (the number of clocks in unit time) of the egress edge node using the clock and control information transferred as shown in FIG. 5. The de-mapper 808 performs the same operations as the PLL shown in FIG. 7. That is, the de-mapper 808 obtains the clocks of the CBR data which was originally transferred to the ingress edge node using the difference between clocks of the ingress edge node transferred and that of the CBR data, and the clock of the ingress edge node. The obtained clock is transferred to the storage unit 806 and the storage unit 806 outputs the stored CBR data using the clock transferred.

As described above, the present invention can maintain the CBR data clocks input into and output from the optical burst switching network identically.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for communicating control information of optical data, comprising:
    calculating a difference between a frequency of optical data received on an input link of a node and a natural frequency of the node;
    including the calculated difference into the control information; and transmitting the control information.

2. The method as claimed in claim 1, wherein the frequency of the optical data is a number of clocks of the optical data in a unit time and the natural frequency of the node is a number of clocks in a unit time of the node.

3. The method as claimed in claim 1, wherein including the calculated difference into the control information comprises adding the calculated difference to a difference included in the control information which has been received, and including the added difference into the control information.

4. The method as claimed in claim 1, wherein the control information includes a time needed to process the optical data.

5. A method for communicating control information of optical data, the method comprising:
    obtaining a natural frequency of an ingress edge node from received control information; and
    outputting data using the obtained natural frequency,
    wherein the natural frequency is obtained by using a difference between a frequency of optical data received on an input link of a node and a natural frequency of the node which is included in the received control information.

6. A method for communicating control information of optical data, the method comprising:
    converting optical data of a constant bit rate using a natural frequency of an ingress edge node;
    transmitting control information about the optical data; and
    outputting the converted optical data,
    wherein the control information includes information on a difference between a frequency of the optical data of a constant bit rate and the natural frequency of the ingress edge node.

7. The method as claimed in claim 6, further comprising:
    obtaining a frequency of data of a constant bit rate using the received control information; and
    recovering a frequency of the optical data to a frequency of the data of a constant bit rate using the obtained information.

8. A core node of an optical burst switching network comprising:
    a calculator which is configured to calculate a difference between the number of clocks of optical data transferred to an input link in a unit time and the number of clocks in a unit time of a natural frequency of the optical data; and
    a controller which is configured to add the difference from the calculator and a difference included in control information received on the input link and output the added difference.

9. The core node as claimed in claim 8, further comprising a synchronizer which is configured to delay the optical data to synchronize a receiving time of the received optical data with a reference time of a time slot of the core node.

10. An ingress edge node of an optical burst switching network comprising:
    a data processor which is configured to read and process stored data of a constant bit rate according to a clock of the node; and
    a controller which is configured to calculate information on a difference between the number of clocks in a unit time of the data of a constant bit rate and the number of clocks in a unit time of the ingress edge node, and include the calculated information into control information.

11. The ingress edge node as claimed in claim 10, further comprising a storage unit for storing the transferred data of a constant bit rate according to the clock of the data.

12. An egress edge node of an optical burst switching network comprising:
    an ingress edge node clock recovery phase lock loop for calculating the number of clocks of an ingress edge node in a unit time based on received control information;
    a de-mapper which is configured to calculate the number of clocks of received optical data in a unit time when the optical data is received in an ingress edge node, using the number of the received clocks in the ingress edge node in a unit time and the control information; and
    a storage unit which is configured to output the optical data stored according to the number of clocks transferred from the de-mapper in a unit time, wherein the control information stores information on the number of clocks in a unit time of the nodes located in a path through which the optical data has been transmitted, wherein the control information sequentially updates information on a difference between the number of clocks in unit time, which is a natural frequency of a previous node that has transmitted the optical data and the number of clocks in a unit time, which is a natural frequency of a node that has received the optical data.

* * * * *